United States Patent
Kaarto et al.

(10) Patent No.: US 9,908,952 B2
(45) Date of Patent: Mar. 6, 2018

(54) PROPYLENE-BASED POLYMER WITH REDUCED HIGH-MOLECULAR WEIGHT PORTION

(71) Applicant: W. R. Grace & Co.-Conn., Columbia, MD (US)

(72) Inventors: John K Kaarto, Missouri City, TX (US); Jan W. Van Egmond, Charleston, WV (US); Charles D. Lester, Fayetteville, WV (US)

(73) Assignee: W.R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 15/035,649

(22) PCT Filed: Nov. 14, 2014

(86) PCT No.: PCT/US2014/065749
§ 371 (c)(1),
(2) Date: May 10, 2016

(87) PCT Pub. No.: WO2015/073855
PCT Pub. Date: May 21, 2015

(65) Prior Publication Data
US 2016/0280812 A1 Sep. 29, 2016

Related U.S. Application Data

(60) Provisional application No. 61/904,654, filed on Nov. 15, 2013.

(51) Int. Cl.
*C08F 10/06* (2006.01)
*C08F 2/34* (2006.01)

(52) U.S. Cl.
CPC .............. *C08F 10/06* (2013.01); *C08F 2/34* (2013.01); *C08F 2400/00* (2013.01); *C08F 2500/03* (2013.01); *C08F 2810/00* (2013.01); *C08F 2810/10* (2013.01)

(58) Field of Classification Search
CPC ................. C08F 8/50; C08F 110/06
See application file for complete search history.

(56) References Cited

U.S. PATENT DOCUMENTS

| | | | |
|---|---|---|---|
| 6,214,949 B1 | 4/2001 | Reddy et al. | |
| 6,521,722 B1 | 2/2003 | Bidell et al. | |
| 7,115,689 B2 | 10/2006 | Coalter, III et al. | |
| 7,172,987 B2 | 2/2007 | Kao et al. | |
| 7,935,740 B2 | 5/2011 | Dang et al. | |
| 2006/0217501 A1* | 9/2006 | Migone | C08F 10/00 526/65 |
| 2007/0027275 A1* | 2/2007 | Chen | C08F 10/00 526/65 |
| 2007/0066771 A1* | 3/2007 | Bradley | B01J 31/0212 526/65 |
| 2009/0203863 A1* | 8/2009 | Chen | B01J 8/1809 526/194 |
| 2009/0209706 A1 | 8/2009 | Sheard et al. | |
| 2011/0172377 A1* | 7/2011 | Cai | B01J 8/1809 526/88 |
| 2012/0116029 A1 | 5/2012 | Van Egmond et al. | |
| 2013/0023598 A1* | 1/2013 | Song | C08F 110/06 521/143 |

FOREIGN PATENT DOCUMENTS

| | | |
|---|---|---|
| CA | 1302640 C | 6/1992 |
| CN | 102888055 A | 1/2013 |
| EP | 0320150 A2 | 6/1989 |
| WO | 2010144080 A1 | 12/2010 |
| WO | 2013124219 A1 | 8/2013 |
| WO | WO 2013/124219 * | 8/2013 |

OTHER PUBLICATIONS

International Search Report for PCT/US2014/065749 dated Jan. 26, 2015.
Extended International Search Report for Application EP14861595.8 dated Apr. 26, 2017.

* cited by examiner

*Primary Examiner* — Robert C Boyle
(74) *Attorney, Agent, or Firm* — Lerner, David, Littenberg, Krumholz & Mentlik, LLP

(57) ABSTRACT

The present disclosure provides a process for producing propylene-based polymer. The process includes contacting, under polymerization conditions in a gas phase polymerization reactor, propylene monomer and optionally one or more comonomers with a Ziegler-Natta catalyst composition. The process includes maintaining the temperature of a reaction zone of the reactor at a temperature from greater than 72° C. to less than or equal to 85° C., and forming a propylene-based polymer having a molecular weight ($M_w$) greater than 100,000, and a $M_{z+1}/M_z$ less than 2.20. The resultant propylene-based polymer is advantageous in fiber applications.

5 Claims, No Drawings

PROPYLENE-BASED POLYMER WITH REDUCED HIGH-MOLECULAR WEIGHT PORTION

CROSS-REFERENCE TO RELATED APPLICATIONS

The present application is a national phase entry under 35 U.S.C. § 371 of International Application No. PCT/US2014/065749 filed Nov. 14, 2014, published in English, which claims priority from U.S. Provisional Patent Application No. 61/904,654 filed Nov. 15, 2013, all of which are incorporated herein by reference.

FIELD

The present disclosure is directed to a process for producing propylene-based polymer with a $M_w$ greater than 100,000 and a $M_{z+1}/M_z$ ratio less than 2.20.

BACKGROUND

Synthetic polymer exists as a distribution of chain lengths and a distribution of molecular weight. These distributions are typically characterized as the number average molecular weight ($M_n$) and the weight average molecular weight ($M_w$). The Z average molecular weight ($M_z$) and the Z+1 average molecular weight ($M_{z+1}$) are indicators of the high molecular weight (high-MW) portion present in a polymer.

It is known that the high-MW portion can affect the downstream fabrication processes for a given polymer. For example, the high-MW portion in polypropylene is problematic during fiber spinning Fiber spinning requires the polypropylene molecules to disentangle quickly and over a very short distance (from die to draw-down). However, the presence of long molecule chains (i.e., the high-MW portion) in the polypropylene increases the risk of fiber break during spinning Fiber break during spinning is detrimental as it halts fiber production, requires manpower to troubleshoot and remedy, and reduces production efficiency.

The art recognizes the need for propylene-based polymer with a reduced amount of high-MW portion, and particularly for improved fiber and improved fiber production. The reduced high-MW portion is also important for the production of visbroken propylene-based polymer for high speed fiber spinning Even though the peroxide chain scission reduces the $M_w$ and narrows the molecular weight distribution, it has been found that that the fiber spinning performance of the visbroken product depends on the absence of high-MW species in the polymer prior to visbreaking.

SUMMARY

The present disclosure is directed to a process for producing propylene-based polymer with a $M_w$ greater than 100,000 and a $M_{z+1}/M_z$ ratio less than 2.20. The propylene-based polymer with a $M_w$ greater than 100,000 and a $M_{z+1}/M_z$ ratio less than 2.20 can be fiber spun at higher speeds with reduced risk of fiber breakage than conventional propylene-based polymer. The propylene-based polymer can be visbroken prior to fiber spinning In an embodiment, a process for producing propylene-based polymer is provided and includes contacting, under polymerization conditions in a gas phase polymerization reactor, propylene monomer and optionally one or more comonomers with a Ziegler-Natta catalyst composition. The process includes maintaining the temperature of a reaction zone of the reactor at a temperature from greater than 72° C. to less than or equal to 85° C., preferably from greater than or equal to 75° C. to less than or equal to 85° C., and forming a propylene-based polymer having a molecular weight ($M_w$) greater than 100,000, and a $M_{z+1}/M_z$ less than 2.20.

An advantage of the present disclosure is the provision of a propylene-based polymer that improves fiber production by enabling higher fiber spinning speeds than conventional propylene-based polymer.

An advantage of the present disclosure is the provision of a propylene-based polymer that reduces the risk of fiber break during fiber spinning

DETAILED DESCRIPTION

1. Process

The present disclosure provides a process for producing propylene-based polymer. The process includes contacting, in a gas phase polymerization reactor, propylene monomer and optionally one or more comonomers with a Ziegler-Natta catalyst composition. The process includes maintaining the temperature of the reaction zone of the reaction at a temperature from greater than 72° C. to less than or equal to 85° C., preferably from greater than or equal to 75° C. to less than or equal to 85° C. The process includes forming a propylene-based polymer having a molecular weight ($M_w$) greater than 100,000 and a $M_{z+1}/M_z$ less than 2.20.

The process is performed in a gas phase polymerization reactor. As used herein, "gas-phase polymerization" (or "gas-phase polymerization conditions") is the passage of an ascending fluidizing medium, the fluidizing medium containing one or more monomers, in the presence of a catalyst through a fluidized bed of polymer particles maintained in a fluidized state by the fluidizing medium. The contact between the propylene monomer and the Ziegler-Natta catalyst composition occurs in a reaction zone of the reactor.

In an embodiment, the gas phase polymerization reactor is a gas phase fluidized bed polymerization reactor. "Fluidization," "fluidized," or "fluidizing" is a gas-solid contacting process in which a bed of finely divided polymer particles is lifted and agitated by a rising stream of gas. Fluidization occurs in a bed of particulates when an upward flow of fluid through the interstices of the bed of particles attains a pressure differential and frictional resistance increment exceeding particulate weight. Thus, a "fluidized bed" is a plurality of polymer particles suspended in a fluidized state by a stream of a fluidizing medium. A "fluidizing medium" is one or more olefin gases, optionally a carrier gas (such as $H_2$ or $N_2$) and optionally a liquid (such as a hydrocarbon) which ascends through the gas-phase reactor.

A typical gas-phase fluidized bed polymerization reactor (or gas phase reactor) includes a vessel (i.e., the reactor), the fluidized bed, a distributor plate, an inlet and an outlet, piping, a compressor, a cycle gas cooler or heat exchanger, and a product discharge system. The vessel includes a reaction zone and a velocity reduction zone, each of which is located above the distributor plate. The fluidized bed is located in the reaction zone. The fluidizing medium passes through the gas-phase polymerization reactor at a velocity sufficient to maintain the bed of solid particles in a suspended condition. The gaseous stream containing unreacted gaseous monomer is withdrawn from the reactor continuously, compressed, cooled, and recycled into the reactor. Product is withdrawn from the reactor and make-up monomer is added to the recycle stream.

In an embodiment, the fluidizing medium includes propylene monomer gas and at least one other gas such as an olefin and/or a carrier gas such as hydrogen or nitrogen.

Many operational parameters are monitored and controlled during gas-phase polymerization. One parameter is fluidized bulk density. The "fluidized bulk density" (or "FBD") is the weight of solid (i.e., polymer particles) per unit volume in the fluidized bed. FBD is a mean value which may be greater or less than the localized bulk density at any point in the fixed reactor portion. FBD is a direct indicator of a gas phase reactor's operating health. Unexpected changes in FBD often indicate that the reactor is experiencing problems. The FBD can include an upper fluidized bulk density (UFBD) and a lower fluidized bulk density (LFBD).

In an embodiment, the gas phase fluidized bed polymerization reactor is a commercial scale reactor. A "commercial-scale reactor" is a polymerization reactor capable of producing 40 kilo-tons annually (KTA) or greater than 5 metric tons/hr of propylene-based polymer. A nonlimiting example of a commercial scale gas phase polymerization reactor is a UNIPOL™PP reactor.

A catalyst composition is fed into a lower section of the reactor. Reaction occurs upon contact between the catalyst composition and the fluidizing medium yielding growing polymer particles. The fluidizing medium passes upward through the fluidized bed, providing a medium for heat transfer and fluidization. The reactor includes an expanded section located above the reaction zone. In the expanded section, particles having a terminal velocity higher than the velocity of the fluidizing medium disentrain from the fluidizing medium stream. After leaving the reactor, the fluidizing medium passes through a compressor and one or more heat exchangers to remove the heat of polymerization before it is re-introduced into the reaction section of the reactor. The fluidizing medium may or may not contain an amount of liquid after cooling and condensing.

The catalyst composition includes a Ziegler-Natta procatalyst, a cocatalyst, and a mixed external electron donor (MEED). The Ziegler-Natta procatalyst includes a combination of a magnesium moiety, a titanium moiety and an internal electron donor. The procatalyst composition is produced by way of a halogenation procedure which converts a procatalyst precursor and the internal electron donor into the combination of the magnesium and titanium moieties, into which the internal electron donor is incorporated. The procatalyst precursor from which the procatalyst composition is formed can be a magnesium moiety precursor, a mixed magnesium/titanium precursor, or a benzoate-containing magnesium chloride precursor.

In an embodiment, the magnesium moiety is a magnesium halide. In another embodiment, the magnesium halide is magnesium chloride, or magnesium chloride alcohol adduct.

In an embodiment, the titanium moiety is a titanium halide such as a titanium chloride. In another embodiment the titanium moiety is titanium tetrachloride.

The "internal electron donor" is a compound added during formation of the procatalyst composition that donates a pair of electrons to one or more metals present in the resultant procatalyst composition. The internal electron donor is a diether, a succinate, a 1,3-diol diester, or a phthalate-based compound selected from $C_{1-4}$ dialkyl esters of phthalic or terephthalic acid, phthaloyl dichloride, phthalic anhydride, and $C_{1-4}$ (poly)alkyl ether derivatives thereof.

In an embodiment, the internal electron donor is a phthalate based compound. In a further embodiment, the internal electron donor is diisobutyl phthalate or di-n-butyl phthalate.

Not bounded by any particular theory, it is believed that during formation of the procatalyst (by way of halogenation of a procatalyst precursor) the internal electron donor (1) regulates the position of titanium on the magnesium-based support, (2) facilitates conversion of the magnesium and titanium moieties into respective halides and (3) regulates the crystallite size of the magnesium halide support during conversion. Thus, provision of the internal electron donor yields a procatalyst composition with enhanced stereo selectivity.

The catalyst composition includes a cocatalyst. The cocatalyst is an organoaluminum compound, such as trialkylaluminum-, dialkylaluminum hydride-, alkylaluminum dihydride-, dialkylaluminum halide-, alkylaluminumdihalide-, dialkylaluminum alkoxide-, and alkylaluminum dialkoxide-compounds containing from 1-10, preferably 1-6 carbon atoms in each alkyl- or alkoxide-group. In an embodiment, the cocatalyst is a $C_{1-4}$ trialkylaluminum compound, such as triethylaluminum (TEA).

Propylene monomer and one or more optional olefin comonomers are introduced in the gas-phase polymerization reactor to contact and react with the catalyst composition and to form a propylene-based polymer, or a fluidized bed of propylene-based polymer particles. Nonlimiting examples of suitable olefin comonomers include ethylene, $C_{4-20}$ α-olefins, such as $C_{4-12}$ α-olefins such as 1 butene, 1-pentene, 1 hexene, 4-methyl-1-pentene, 1-heptene, 1-octene, 1-decene, 1-dodecene and the like; $C_{4-20}$ diolefins, such as 1,3-butadiene, 1,3-pentadiene, norbornadiene, 5-ethylidene-2-norbornene (ENB) and dicyclopentadiene; $C_{8-40}$ vinyl aromatic compounds including styrene, o-, m-, and p-methylstyrene, divinylbenzene, vinylbiphenyl, vinylnapthalene; and halogen-substituted $C_{8-40}$ vinyl aromatic compounds such as chlorostyrene and fluorostyrene.

The catalyst composition includes a mixed external electron donor (MEED) composed of one or more selectivity control agents (SCA) and one or more activity limiting agents (ALA). The SCA is an alkoxysilane having the general formula: $SiR_m(OR')_{4-m}$, (I) where R independently each occurrence is hydrogen or a hydrocarbyl or an amino group optionally substituted with one or more substituents containing one or more Group 14, 15, 16, or 17 heteroatoms, R contains up to 20 atoms not counting hydrogen and halogen, R' is a $C_{1-20}$ alkyl group, and m is 0, 1, 2 or 3. In an embodiment, R is $C_{6-12}$ aryl, alkyl or aralkyl, $C_{3-12}$ cycloallyl, $C_{3-12}$ branched alkyl, or $C_{3-12}$ cyclic amino group, R' is $C_{1-4}$ allyl, and m is 1 or 2.

Nonlimiting examples of suitable alkoxysilane compositions include dicyclopentyldimethoxysilane, di-tert-butyldimethoxysilane, methylcyclohexyldimethoxysilane, methylcyclohexyldiethoxysilane, di-n-butyldimethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, cyclopentylpyrrolidinodimethoxysilane, bis(pyrrolidino)dimethoxysilane, bis(perhydroisoquinolino)dimethoxysilane, and dimethyldimethoxysilane.

In an embodiment, the SCA is selected from dicyclopentyldimethoxysilane, methylcyclohexyldimethoxysilane, and n-propyltrimethoxysilane, and combinations thereof.

In an embodiment, the SCA is n-propyltrimethoxysilane.

The MEED includes one or more activity limiting agents. As used herein, an "activity limiting agent" ("ALA") is a material that reduces catalyst activity at elevated temperature (i.e., temperature greater than about 85° C.). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The ALA is an aliphatic carboxylic acid ester. The aliphatic carboxylic acid ester may be a $C_4$-$C_{30}$ aliphatic acid ester, may be a mono- or a poly- (two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ allyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ mono- or polycarboxylate derivatives of $C_{2-100}$ (poly)glycols or $C_{2-100}$ (poly)glycol ethers. In a further embodiment, the $C_4$-$C_{30}$ aliphatic acid ester may be a laurate, a myristate, a palmitate, a stearate, an oleates, a sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl tri(acetate), glyceryl tri-ester of $C_{2-40}$ aliphatic carboxylic acids, and mixtures thereof. In a further embodiment, the $C_4$-$C_{30}$ aliphatic ester is isopropyl myristate or di-n-butyl sebacate.

In an embodiment, the ALA is isopropyl myristate.

In an embodiment, the ALA is di-n-butyl sebacate.

In an embodiment, the MEED is any combination of (i) n-propyltrimethoxysilane, methyl cyclohexyldimethoxysilane, dicyclopentyldimethoxysilane and/or diisopropyldimethoxysilane with (ii) any combination of isopropyl myristate and/or di-n-butyl sebacate.

In an embodiment, the MEED is n-propyltrimethoxysilane and isopropyl myristate.

In an embodiment, the MEED is n-propyltrimethoxysilane and di-n-butyl sebacate.

In an embodiment, the MEED is methylcyclohexyldimethoxysilane and di-n-butyl sebacate.

In an embodiment, the MEED is methylcyclohexyldimethoxysilane and isopropyl myristate.

In an embodiment, the MEED is dicyclopentyldimethoxysilane and isopropyl myristate.

In an embodiment, the MEED is dicyclopentyldimethoxysilane and di-n-butyl sebacate.

In an embodiment, the MEED is diisopropyldimethoxysilane and isopropyl myristate.

In an embodiment, the MEED is diisopropyldimethoxysilane and di-n-butyl sebacate.

The process includes contacting propylene monomer (and optionally one or more comonomers) with the Ziegler-Natta catalyst composition (with the phthalate-based compound as internal electron donor, cocatalyst, and MEED), maintaining the temperature of the fluidized bed at a temperature from greater than 72° C. to less than or equal to 85° C., preferably from greater than or equal to 75° C. to less than or equal to 85° C., and forming a propylene-based polymer having a molecular weight ($M_w$) greater than 100,000 and a $M_{z+1}/M_z$ less than 2.20. The contact step occurs in the reaction zone of the gas phase polymerization reactor.

Polymers exist as a distribution of chain lengths and a distribution of molecular weight. Polymer molecular weight is described as the average molecular weight calculated from the molecular weights of all the chains in the sample. The number average molecular weight is the statistical average molecular weight of all the polymer chains in the sample, and is defined by equation (I):

$$Mn = \frac{\Sigma N_i M_i}{\Sigma N_i} \qquad (I)$$

wherein $M_i$ is the molecular weight of a chain and $N_i$ is the number of chains of that molecular weight. $M_n$ can be predicted by polymerization mechanisms and is measured by methods that determine the number of molecules in a sample of a given weight.

A series of average molecular weights can be defined by the equation (II):

$$M = \frac{\Sigma N_i M^{n+1}}{\Sigma N_i M_i^n} \qquad (II)$$

wherein  $n = 1$ gives $M = M_w$
$n = 2$ gives $M = M_z$
$n = 3$ gives $M = M_{z+1}$ The higher averages, the Z-average ($M_z$) and the Z+1 average ($M_{z+1}$), are increasingly more sensitive to the high molecular weight chains present in the polymer.

The form of the equations for average molecular weight is such that:

$$M_n < M_w < M_z < M_{z+1}$$

$M_n$, $M_w$, $M_z$, and $M_{z+1}$ each is determined by gel permeation chromatography and/or size exclusion chromatography.

$M_n$ is most sensitive to the smaller molecules in the molecular weight distribution, $M_w$ is most affected by molecules in the middle of the distribution, and $M_z$ is most sensitive to changes in the high molecular weight portion of the molecular weight distribution. $M_{z+1}$ is extremely sensitive to very small changes in the high molecular weight portion of the distribution. Of the molecular weight averages, $M_w$ is usually the average that best correlates with bulk polymer properties.

The present propylene-based polymer with a $M_{z+1}/M_z$ ratio (or $M_{z+1}/M_z$) of less than 2.20 indicates that the present propylene-based polymer has a smaller content of high-MW components than conventional propylene-based polymer.

Applicant discovered that utilizing a Ziegler-Natta procatalyst with phthalate-based compound internal electron donor in conjunction with a MEED enables gas phase polymerization to operate at a higher reaction temperature (i.e., greater than 72° C. to less than or equal to 85° C.). Conventional commercial-scale gas phase polymerization is typically performed at a temperature from 65° C. to no greater than 72° C. Bounded by no particular theory, it is believed the MEED stabilizes commercial scale operating conditions by reducing the risk (or preventing the risk) of run-away reactor, reactor fouling, and/or polymer agglomeration. In addition, the high activity and the stability of the Ziegler-Natta procatalyst (with phthalate-based internal electron donor) at elevated temperature (greater than 72° C. to less than or equal 85° C.) enables production of propylene-based polymer with a $M_w$ greater than 100,000. Applicant discovered an unexpected synergy resulting from higher reaction temperature (of greater than 72° C. to less than or equal to 85° C.), high activity catalyst (greater than 15 kg polymer/g catalyst) that is stable at this higher reaction temperature—namely, the unexpected production of propylene-based polymer with $M_w$ of greater than 100,000 and a reduction in the high MW tail component ($M_{z+1}/M_z$ less than 2.20). Propylene-based polymer with a $M_w$ greater than 100,000 and $M_{z+1}/M_z$ less than 2.20 is advantageous for applications such as fiber production, for example.

In an embodiment, the process includes contacting propylene monomer and ethylene comonomer with the Ziegler-Natta catalyst composition in the reactor, maintaining the temperature of the fluidized bed at a temperature from greater than 72° C. to less than or equal to 85° C., and forming a propylene/ethylene copolymer having a molecular weight ($M_w$) greater than 100,000 and a $M_{z+1}/M_z$ less than 2.20. In a further embodiment, the propylene/ethylene copolymer has from 0.5 wt %, or 1.0 wt %, or 2.0 wt %, to 3.0 wt %, or 4.0 wt %, or 5.0 wt % units derived from ethylene.

In an embodiment, the process includes contacting propylene monomer with the Ziegler-Natta catalyst composition, maintaining the temperature of the fluidized bed from greater than or equal to 75° C. to less than or equal to 85° C. and forming propylene homopolymer having a $M_w$ greater than 200,000, a $M_w/M_n$ less than 6.0, and a $M_{z+1}/M_z$ less than 2.20. The $M_w$ can be from 230,000, or 250,000 to 300,000, or 350,000 or 400,000, or 450,000. The $M_w/M_n$ can be from 4.0, or 4.5 to 5.0, or 5.5 to less than 6.0. The $M_{z+1}/M_z$ can be less than 2.20, or from 1.5, or 1.7, or 1.9, to 2.0 or 2.1, or 2.18. In another embodiment, the process may further comprise visbreaking the propylene homopolymer and forming a propylene homopolymer with a $M_w/M_n$ less than 3.0.

In an embodiment, the process includes contacting propylene monomer with the Ziegler-Natta catalyst composition, maintaining the temperature of the fluidized bed from greater than or equal to 80° C. to less than or equal to 85° C., and forming propylene homopolymer having a $M_w$ greater than 220,000, a $M_w/M_n$ less than 4.0, and a $M_{z+1}/M_z$ less than 2.0. The $M_w$ can be from 225,000, or 229,000 to 230,000, or 233,000, or 236,000, or 239,000, or 240,000. The $M_w/M_n$ can be from 3.0, or 3.4 to 3.5, or 3.7, or 3.9, or 3.96. The $M_{z+1}/M_z$ can be from 1.5, or 1.6, or 1.7 to 1.8, or 1.9, or 1.97. In another embodiment, the process may further comprise visbreaking the propylene homopolymer and forming a propylene homopolymer with a $M_w/M_n$ less than 3.0.

In an embodiment, the process produces propylene homopolymer with a melt flow rate (MFR) from 0.5 g/10 min to 3.5 g/10 min, and a xylene solubles content from 1.0 wt % to 3.6 wt %.

In an embodiment, the Ziegler-Natta catalyst composition includes a MEED with isopropyl myristate or di-n-butyl sebacate, and the present propylene-based polymer contains isopropyl myristate or di-n-butyl sebacate.

The present propylene-based polymer may comprise two or more embodiments disclosed herein.

2. Fiber

The propylene-based polymer produced by the present process may be used to produce a fiber. A "fiber," as used herein, is an elongated strand of material with a round, or substantially round, cross section. Other cross-sectional shapes for the fiber include a trilobal shape, or a flat (i.e., "ribbon" like) shape. A fiber typically has a length that is at least two times greater (or more) than the fiber diameter. A fiber excludes a film which has opposing parallel, or substantially parallel, sides.

The fiber contains any of the propylene-based polymers produced by the present process as disclosed above, the propylene-based polymer having a $M_w$ greater than 100,000, a $M_w/M_n$ less than 6.0, and a $M_{z+1}/M_z$ less than 2.20.

In an embodiment, the present fiber is a melt-spun fiber. A "melt-spun fiber," as used herein, is a fiber produced by a melt-spinning process. The term melt-spun, or "melt-spinning," or "fiber spinning," and like terms is the process whereby a polymer melt is extruded through a plurality of fine die capillaries (such as a spinnerette, for example) as molten filaments while simultaneously applying an extensional force which reduces the diameter of the molten filaments. The molten filaments solidify upon cooling below their melt temperature to form fibers. The term "melt spinning" encompasses continuous fiber spinning, bulk continuous filament fiber, and spunbond nonwovens fibers.

In an embodiment, the melt-spun fiber (composed of the present propylene-based polymer) has a thickness from 0.5 denier, or 1.5 denier, or 2.0 denier, or 2.5 denier, or 3.0 denier to 5.0 denier, or 10.0 denier, or 15.0 denier.

In an embodiment, the melt-spun fiber (composed of the present propylene-based polymer) has a diameter from 200 nanometers to 10 microns or 20 microns.

In an embodiment, the melt-spun fiber (composed of the present propylene-based polymer) has a ramp to break from 4000, or 4300 to 4700, or 4800, or 4900, or 5000 meters per minute (mpm).

The melt-spun fiber composed of the present propylene-based polymer can be used for making nonwoven fabrics. As used herein a "nonwoven" or "nonwoven fabric" or "nonwoven material" means an assembly of fibers including bicomponent fibers (for example, core/sheath, islands in the sea, side-by side, segmented pie, etc.) held together in a random web such as by mechanical interlocking or by fusing at least a portion of the fibers. Nonwoven fabrics can be made by various methods. The present melt-spun fiber, or multiple combinations thereof, can be formed into a web which is thereafter is formed into a nonwoven fabric using binding technologies such as carded thermal bonding, wet-laid, airlaid, airthrough bonding, calendar thermal bonding, hydro entanglement, needlepunching, adhesive honding or any combinations thereof.

The present melt-spun fiber can be used with a carding line to produce fabric.

The present melt-spun fiber can be used in a spunbond nonwoven process. In the spunbond nonwoven process, long continuous monocomponent and/or bicomponent fibers are produced and randomly deposited in the form of a web on a continuous belt. Bonding can then be accomplished by methods known in the art such as hot-roll calendering or by passing the web through a saturated-steam chamber at elevated pressure or using hydro entanglement or hot air through bonding or needlepunching etc. Present melt-spun fiber is particularly well suited to make a spunbonded nonwoven material and multilayer composite materials where various optimized line configurations such as SMS, SMMS, SMMMS, SSMMS.

The present melt-spun fiber can be used to make carpeting, woven textiles, artificial turf, or other fiber-containing articles.

DEFINITIONS

The numerical figures and ranges here are approximate, and thus may include values outside of the range unless otherwise indicated. Numerical ranges (e.g., as "X to Y", or "X or more" or "Y or less") include all values from and including the lower and the upper values, in increments of one unit, provided that there is a separation of at least two units between any lower value and any higher value. As an example, if a compositional, physical or other property, such as, for example, temperature, is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

The terms "comprising", "including", "having" and their derivatives do not exclude the presence of any additional component or procedure. The term, "consisting essentially of" excludes any other component or procedure, except those essential to operability. The term "consisting of" excludes any component or procedure not specifically stated.

The term "denier" is the linear mass density of a fiber. Denier is defined as the grams of the fiber per 9000 meters of the fiber length.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

The term, "propylene-based polymer," as used herein, is a polymer that comprises propylene homopolymer or a majority weight percent polymerized propylene monomer (based on the total amount of polymerizable monomers), and optionally may comprise at least one co-polymerized alpha-olefin.

The term "propylene/ethylene copolymer," as used herein, is a copolymer that comprises a majority weight percent polymerized propylene monomer (based on the total amount of the polymerizable monomers), a minority weight percent of polymerized ethylene monomer. Ethylene is considered an alpha-olefin.

The term "ramp to break" is the drawing speed (meters per minute or mpm) at which the melt-spun fiber completely breaks and is discontinuous.

TEST METHODS

Density is determined in accordance with ASTM D 792.

Gel permeation Chromatography—High Temperature Gel Permeation Chromatography (GPC) Analytical Method for Polypropylene The polymers are analyzed on a PL-220 series high temperature gel permeation chromatography (GPC) unit equipped with a refractometer detector and four PLgel Mixed-A (20μm) columns (Polymer Laboratory Inc.). The oven temperature is set at 150° C. and the temperatures of autosampler's hot and the warm zones are at 135° C. and 130° C. respectively. The solvent is nitrogen purged 1,2,4-trichlorobenzene (TCB) containing ~200 ppm 2,6-di-t-butyl-4-methylphenol (BHT). The flow rate is 1.0 mL/min and the injection volume is 200 μl. A 2 mg/mL sample concentration is prepared by dissolving the sample in $N_2$ purged and preheated TCB (containing 200 ppm BHT) for 2.5 hrs at 160° C. with gentle agitation.

The GPC column set is calibrated by running twenty narrow molecular weight distribution polystyrene standards. The molecular weight ($M_w$) of the standards ranges from 580 to 8,400,000 g/mol, and the standards are contained in six "cocktail" mixtures. Each standard mixture has at least a decade of separation between individual molecular weights. The polystyrene standards are prepared at 0.005 g in 20 mL of solvent for molecular weights equal to or greater than 1,000,000 g/mol and 0.001 g in 20 mL of solvent for molecular weights less than 1,000,000 g/mol. The polystyrene standards are dissolved at 150° C. for 30 min under stirring. The narrow standards mixtures are run first and in order of decreasing highest molecular weight component to minimize degradation effect. A logarithmic molecular weight calibration is generated using a fourth-order polynomial fit as a function of elution volume. The equivalent polypropylene molecular weights are calculated by using following equation with reported Mark-Houwink coefficients for polypropylene (Th.G. Scholte, N. L. J. Meijerink, H. M. Schoffeleers, and A. M. G. Brands, J. Appl. Polym. Sci., 29, 3763 3782 (1984)) and polystyrene (E. P. Otocka, R. J. Roe, N. Y. Hellman, P. M. Muglia, Macromolecules, 4, 507 (1971)):

$$M_{PP} = \left( \frac{K_{PS} M_{PS}^{a_{PS}+1}}{K_{PP}} \right)^{\frac{1}{a_{PP}+1}}$$

Where is $M_{pp}$ equivalent $M_W$, $M_{PS}$ is PS equivalent $M_W$, log K and a values of Mark-Houwink coefficients for PP and PS are listed below.

| Polymer | a | log K |
|---|---|---|
| Polypropylene (PP) | 0.725 | −3.721 |
| Polystyrene (PS) | 0.702 | −3.900 |

The calculations of $M_n$, $M_w$, $M_z$, and $M_{z+1}$ based on GPC results using the refractometer detector (dRI) and the narrow standards calibration are determined from the following equations:

$$\overline{Mn} = \frac{\sum_i dRI_i}{\sum_i \left( \frac{dRI_i}{M_{PP,i}} \right)} \quad (1)$$

$$\overline{Mw} = \frac{\sum_i (dRI_i * M_{PP,i})}{\sum_i dRI_i}, \quad (2)$$

-continued $$\overline{Mz} = \frac{\sum_{i}(dRI_i * M_{PP,i}^2)}{\sum_{i}(dRI_i * M_{PP,i})} \quad (3)$$

$$\overline{Mz+1} = \frac{\sum_{i}(dRI_i * M_{PP,i}^3)}{\sum_{i}(dRI_i * M_{PP,i}^2)} \quad (4)$$

Where $dRI_i$ and $M_{PP,i}$ are the dRI baseline corrected response and conventional calibrated polypropylene molecular weight for the $i^{th}$ slice of the dRI response.

Melt flow rate (MFR) is measured in accordance with ASTM D 1238 test method at 230° C. with a 2.16 kg weight for propylene-based polymers.

Ramp to Break test is a fiber spinning test where the filaments are drawn down from the die at progressively higher speeds until spin breaks occur. This test is repeated 3-5 times per sample and provides a means of evaluating/comparing the high speed spin-ability of propylene-based polymer compositions. The test is run on a multifilament fiber extrusion spinning line manufactured by Hills R&D (Florida, USA) using a 60 hole die with 600 micron die holes with a fixed polymer flow of 0.60 g/min per hole. The polymer melt temperature is 230° C. The line is set at 1500 meters/min and the spin velocity is increased (ramped) at 500 m/min/min using a mechanical take-off and the speed at which the filaments break is recorded.

Xylene soluble portion is determined by a method adapted from ASTM D5492-06. The procedure consists of weighing 2 g of sample and dissolving it in 200 ml o-xylene in a 400 ml flask with 24/40 joint. The flask is connected to a water cooled condenser and the contents are stirred and heated to reflux under $N_2$, and then maintained at reflux for an additional 30 minutes. The solution is then cooled in a temperature controlled water bath at 25° C. for a minimum of 45 minutes to allow the crystallization of the xylene insoluble fraction. Once the solution is cooled and the insoluble fraction precipitates from the solution, the separation of the xylene soluble portion (XS) from the xylene insoluble portion (XI) is achieved by filtering through 25 micron filter paper. 100 ml of the filtrate is collected into a pre-weighed aluminum pan, and the o-xylene is evaporated from this 100 ml of filtrate under a nitrogen stream. Once the solvent is evaporated, the pan and contents are placed in a 100° C. vacuum oven for 30 minutes or until dry. The pan is then allowed to cool to room temperature and weighed. Xylene soluble portion is calculated as XS (wt %)=$[(m_3-m_2)*2/m_1]*100$, where $m_1$ is the original weight of the sample used, $m_2$ is the weight of empty aluminum pan, and $m_3$ is the weight of the pan and residue.

Some embodiments of the present disclosure will now be described in detail in the following Examples.

EXAMPLES

1. Polymerization Conditions

Gas-phase fluidized bed polymerization of propylene monomer is performed in a UNIPOL™ reactor. The catalyst composition is a Ziegler-Natta catalyst composition composed of SHAC™ 320 procatalyst with diisobutyl phthalate internal electron donor. The cocatalyst is triethyl aluminum. The MEED is n-propyltrimethoxysilane (N) and isopropyl myristate (IPM). The polymerization conditions are provided in Table 1 below.

TABLE 1

Polymerization conditions

| | Example | | | | | | | |
|---|---|---|---|---|---|---|---|---|
| | CS-A | CS-B | Ex 1 | Ex 2 | Ex 3 | Ex 4 | Ex 5 | Ex 6 |
| XS (wt %) wet | 3.15 | 3.25 | 3.32 | 3.36 | 3.58 | 2.99 | 3.47 | 3.11 |
| MFR (g/10 min) | 3.15 | 3.00 | 3.48 | 3.25 | 3.30 | 3.45 | 3.19 | 3.31 |
| Catalyst Productivity (lb/lb) | 24,780 | 22,398 | 25,037 | 23,326 | 13,995 | 13,193 | 14,754 | 18,790 |
| Bulk Density (lb/ft3) | 24.7 | 25.0 | 25.5 | 24.8 | 28.4 | 28.5 | 27.6 | 27.4 |
| Al/Ti Mole Ratio | 57 | 50 | 65 | 63 | 42 | 45 | 27 | 42 |
| Reactor Temperature (° C.) | 70.0 | 72.0 | 75.0 | 80.0 | 80.0 | 80.0 | 85.0 | 85.0 |
| Propylene Partial Pressure (psia) | 299.7 | 300.0 | 299.8 | 300.3 | 319.5 | 319.8 | 320.8 | 330.7 |
| Al/SCA Mole Ratio | 6.6 | 6.4 | 6.5 | 6.2 | 6.3 | 6.2 | 5.8 | 5.6 |
| H2/C3 Mole Ratio | 0.0032 | 0.0028 | 0.0028 | 0.0019 | 0.0020 | 0.0020 | 0.0015 | 0.0015 |
| Reactor Bed Wt (lb) | 83 | 83 | 84 | 85 | 69 | 68 | 68 | 68 |
| Residence Time (hr) | 2.2 | 2.2 | 2.5 | 2.5 | 2.0 | 1.9 | 1.9 | 2.4 |
| Production Rate (lb/hr) | 36.9 | 38.1 | 34.1 | 34.0 | 35.1 | 35.0 | 35.4 | 28.0 |

CS—comparative sample
Ex—Inventive example

The properties of propylene homopolymer are shown in Table 2 below.

TABLE 2

Propylene homopolymer properties

| | Bed Temp (° C.) | Xylene Solubles (% wt) | $M_n$ | $M_w$ | $M_z$ | $M_w/M_n$ | $M_{z+1}/M_w$ | $M_{z+1}/M_z$ |
|---|---|---|---|---|---|---|---|---|
| CS-A | 70° C.* | 3.15 | 64,740 | 378,610 | 1,424,000 | 5.85 | 10.51 | 2.79 |
| CS-B | 72° C.* | 3.25 | 58,360 | 361,300 | 1,227,300 | 6.19 | 7.55 | 2.22 |

TABLE 2-continued

Propylene homopolymer properties

|  | Bed Temp (° C.) | Xylene Solubles (% wt) | $M_n$ | $M_w$ | $M_z$ | $M_w/M_n$ | $M_{z+1}/M_w$ | $M_{z+1}/M_z$ |
|---|---|---|---|---|---|---|---|---|
| Example 1 | 75° C. | 3.32 | 58,590 | 340,980 | 1,090,400 | 5.82 | 6.95 | 2.17 |
| Example 2 | 80° C. | 3.36 | 60,830 | 345,570 | 1,077,900 | 5.68 | 6.66 | 2.14 |

*comparative
CS—comparative sample

In Table 2, $M_w$ drops as the polymerization reaction temperature increases. $M_{z+1}$ drops even faster than $M_w$ as the polymerization temperature increases. When the polymerization temperature (fluidized bed temperature) is increased to greater than 72° C. to less than or equal to 85° C., a synergistic effect is observed in the creation of propylene homopolymer with $M_w$ greater than 325,000, $M_w/M_n$ less than 6.0, and $M_{z+1}/M_z$ less than 2.20

The properties of propylene homopolymer are shown in Table 3 below.

TABLE 3

Propylene homopolymer properties

|  | Ex 3 | Ex 4 | Ex 5 | Ex 6 |
|---|---|---|---|---|
| Bed T (° C.) | 80.0 | 80.0 | 85.0 | 85.0 |
| XS (wt %) | 3.571 | 3.362 | 3.538 | 3.159 |
| $M_n$ | 60,380 | 58,964 | 59,808 | 63,531 |
| $M_w$ | 233,431 | 229,019 | 236,101 | 239,154 |
| $M_z$ | 568,439 | 560,995 | 584,410 | 580,583 |
| $M_w/M_n$ | 3.87 | 3.88 | 3.95 | 3.76 |
| $M_{z+1}$ | 1,094,575 | 1,083,431 | 1,151,752 | 1,115,788 |
| $M_{z+1}/M_w$ | 4.69 | 4.73 | 4.88 | 4.67 |
| $M_{z+1}/M_z$ | 1.93 | 1.93 | 1.97 | 1.92 |

Applicant discovered propylene homopolymer produced by the present process is desirable in fiber spinning applications. Fiber production requires propylene-based polymer with low Mw/Mn (i.e., less than 6.0) and a small amount of high-MW portion. During draw-down, the polypropylene molecules must be disentangled in a short time/distance between the die to the drawing roller. Fiber is typically drawn down from a diameter of 600 μm to a diameter of 20 μm diameter.

Long polypropylene molecules yield entanglement and result in spin-break i.e., fiber failure during draw-down. Applicant discovered the propylene-based polymer produced by the present process and having a $M_w$ greater than 100,000, an $M_w/M_n$ less than 6.0 and a $M_{z+1}/M_z$ less than 2.20 improves fiber melt-spinning by (1) enabling faster fiber-spinning rates with (2) reduced, or no, spin-breaks.

For improved high speed spin-ability it is well known in the art to use narrow molecular weight distribution (MWD) propylene-based polymer resins. For propylene-based polymer grades made from Ziegler-Natta catalyst, it is common to use peroxide visbreaking to narrow the MWD. In a study of 10 samples of peroxide visbroken propylene homopolymers having MFR within 38+/−2 dg/min, cracked from starting as-polymerized propylene homopolymer "powder" having MFR from 0.98 to 4.23, differences are observed in ramp-to-break spin-ability from 4000 to 5500 m/min. Linear regression shows no correlation between the ramp-to break and a) crack ratio (MFRf/MFRi, f=cracked, i=powder), b) pellet $M_w/M_n$ (from GPC), c) c) pellet $M_z/M_w$, d) pellet $M_{z+1}/M_w$, and e) pellet $M_{z+1}/M_z$ as the R-squared of less than 0.1 was observed in each case. Linear regression of the fiber spinning ramp-to break against MWD data for the present propylene homopolymer powder before peroxide visbreaking showed much better correlations; f) powder $M_w/M_n$ (R-squared 0.35), g) powder $M_z/M_w$ (R-squared 0.60), h) powder $M_{z+1}/M_w$ (R-squared 0.74), and i) powder $M_{z+1}/M_z$ (R-squared 0.65). Based on this study the MWD and in particular the $M_{z+1}/M_w$, and $M_{z+1}/M_z$, of the present propylene-based polymer (produced by the present method) is important toward achieving good high speed spin-ability in visbroken propylene homopolymer fiber-grade resins. In view of this, the results show that the present process of increased reactor temperatures decreases the values of these features and demonstrates that the present process can be applied to the polymerization of propylene-based polymer for fiber applications.

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A process for producing propylene-based polymer comprising:
    contacting, under polymerization conditions in a gas phase polymerization reactor having a reaction zone, propylene monomer and optionally one or more comonomers with a Ziegler-Natta catalyst composition;
    maintaining the reaction zone of the gas phase polymerization reactor at a temperature from greater than 72° C. to less than 85° C.; and
    forming a propylene-based polymer having a weight average molecular weight, $M_w$, greater than 100,000, and a ratio of Z+1 average molecular weight to Z average molecular weight, $M_{z+1}/M_z$, less than 2.20; and further comprising visbreaking the propylene-based polymer and forming a propylene-based polymer with a weight average molecular weight to number average molecular weight ratio, $M_w/M_n$, less than 3.0;

wherein:
(a) the Ziegler-Natta catalyst composition comprises a phthalate-based internal electron donor and a mixed external electron donor comprising one or more alkoxysilanes and one or more activity limiting agents comprising a $C_4$-$C_{30}$ aliphatic carboxylic acid ester; and
(b) xylene solubles content of the propylene-based polymer is 1.0 to 3.6 wt %.

2. The process of claim 1, wherein the gas phase polymerization reactor is a gas phase fluidized bed polymerization reactor.

3. The process of claim 1 comprising maintaining the temperature of the reaction zone from greater than or equal to 75° C. to less than 85° C.

4. The process of claim 2
contacting propylene monomer with the Ziegler-Natta catalyst composition;
wherein the gas phase fluidized bed polymerization reactor is maintained at a temperature from greater than or equal to 75° C. to less than 85° C.; and
forming a propylene homopolymer with a $M_w$ greater than 200,000, a $M_w/M_n$, less than 6.0, and a $M_{z+1}/M_z$ less than 2.20; and
further comprising visbreaking the propylene homopolymer and forming a propylene homopolymer with a weight average molecular weight to number average molecular weight ratio, $M_w/M_n$, less than 3.0.

5. The process of claim 2 comprising
contacting propylene monomer with the Ziegler-Natta catalyst composition;
maintaining the temperature of the gas phase fluidized bed polymerization reactor from greater than or equal to 80° C. to less than 85° C.; and
forming a propylene homopolymer having a $M_w$ greater than 220,000, a $M_w/M_n$ less than 6.0, and a $M_{z+1}/M_z$ less than 2.20; and
further comprising visbreaking the propylene homopolymer and forming a propylene homopolymer with a weight average molecular weight to number average molecular weight ratio, $M_w/M_n$, less than 3.0.

* * * * *